United States Patent [19]

Guyer et al.

[11] 4,296,466

[45] Oct. 20, 1981

[54] DATA PROCESSING SYSTEM INCLUDING A SEPARATE INPUT/OUTPUT PROCESSOR WITH MICRO-INTERRUPT REQUEST APPARATUS

[75] Inventors: James M. Guyer, Marlboro; Joseph T. West, Boxborough, both of Mass.

[73] Assignee: Data General Corporation, Westboro, Mass.

[21] Appl. No.: 871,689

[22] Filed: Jan. 23, 1978

[51] Int. Cl.³ .................... G06F 13/00; G06F 15/16
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,368,207 | 2/1968 | Beausoleil et al. | 364/200 |
| 3,673,576 | 6/1972 | Donaldson, Jr. | 364/200 |
| 3,766,526 | 10/1973 | Buchanan | 364/200 |
| 3,973,244 | 8/1976 | Lovercheck et al. | 364/200 |
| 3,997,875 | 12/1976 | Broeren | 364/200 |
| 4,067,059 | 1/1978 | Derchak | 364/200 |
| 4,075,691 | 2/1978 | Davis et al. | 364/200 |
| 4,079,452 | 3/1978 | Larson et al. | 364/200 |
| 4,080,649 | 3/1978 | Calle et al. | 364/200 |
| 4,080,652 | 3/1978 | Cronshaw et al. | 364/200 |
| 4,099,243 | 7/1978 | Palumbo | 364/200 |
| 4,124,891 | 11/1978 | Weller et al. | 364/200 |
| 4,149,239 | 4/1979 | Jenkins et al. | 364/200 |

*Primary Examiner*—Melvin B. Chapnick
*Attorney, Agent, or Firm*—Robert F. O'Connell

[57] ABSTRACT

A data processing system having a host processor, a host memory, a host memory management unit and an input/output bus and further including a separate input/output (I/O) processor with its own local memory for handling the transfer of data between I/O devices on its own I/O processor I/O bus and the host main memory. The I/O processor has the capability of directly accessing main memory via the host standard data channel. The I/O processor has the capability of interrupting the host processor operation in a special way by a "micro-interrupt" process such that the host processor thereby re-allocates the contents of a selected memory allocation unit (MAP) of the host memory management unit faster than using standard interrupt routines. Such re-allocation then permits the I/O processor to transfer data directly to and from the host main memory via the re-allocated memory management unit without the need for further processing by the host processor, the I/O processor providing a suitable identification of the selected MAP which is to be re-allocated. The system further prevents access to the host memory by any other I/O processor while a first I/O processor is performing a read-modify-write operation with respect to the host memory.

13 Claims, 10 Drawing Figures

DATA PROCESSING SYSTEM INCLUDING A SEPARATE INPUT/OUTPUT PROCESSOR WITH MICRO-INTERRUPT REQUEST APPARATUS

INTRODUCTION

This invention relates generally to data processing systems and, more particularly, to such systems which utilize a separate input/output (I/O) processor for communicating between a host processor and one or more peripheral I/O devices.

BACKGROUND OF THE INVENTION

In most conventional data processing systems, communication between a central, or host, processing unit and one or more peripheral I/O devices, such as large capacity storage devices of the tape or disc type, display devices, card readers, and the like, is normally achieved by means of an I/O bus to which all of the I/O devices have access. Normally when access to the host processor or to the host main memory is required by an external I/O device, the latter device must generate an "interrupt" signal which must then be appropriately processed by the central processor unit to identify the I/O unit and to determine what operation the interrupting unit requires the host processor to perform. The host processor must stop its operation, i.e. interrupt its present machine state, in order to process the interrupt signal. That is, the host processor must identify the interrupting device, must perform whatever data handling is required, and must restore the host processor to its previous machine state so that it can resume the operation it was performing prior to interruption. The processing of such an interrupt signal normally requires a relatively long time period before the processor is ready to resume its previous operation.

In order to avoid the excessive time required for such interrupt processing, it has been suggested that a separate processor unit, commonly designated as an I/O processor, be utilized as an intermediary between external I/O devices and the main, or host, processor unit. Such I/O processor is normally provided access to the host I/O bus and, in turn, has its own I/O bus to which access can be obtained by one or more peripheral I/O devices. In such a way the I/O processor performs the processing which is required when an interrupt signal is transmitted from an I/O device so that the main or host processing unit is not required to stop its operation for such interrupt signal processing. The I/O processor thereupon takes care of the transfer of data to or from the I/O device and, thence, to or from the main processor unit or the main memory of the host machine. The host processor then merely handles the I/O data manipulations only, which manipulations can be achieved at the host processor high speed of operation, the data transfer to and from the I/O devices being handled by the separate I/O processor.

The I/O processor often has its own local memory, usually of relatively low storage capacity which provides for the storage of programs for processing interrupts and for the local storage of data before transfer either to or from the host processor or to or from the I/O device.

In such presently used systems, the I/O processor must interrupt the host processor (in effect, on behalf of the I/O devices), to provide a particular memory allocation which is required by the I/O processor or by the IOP I/O devices utilizing host memory. While the interrupt processing which must occur in the host processor is not nearly as extensive as it would be if the host processor were dealing with the I/O devices directly, there is still a certain amount of interrupt processing time that must be used by the host processor in order to define the extent of the interrupt service which has to be performed. It is desirable to minimize the processing time that the host processor must use for such purpose so that it can return to its normal operations as quickly as possible, even when using a separate I/O processor.

Further, if more than one I/O processor is used on the host I/O bus, a priority among them must be established with respect to use of the host I/O bus. For example, if an I/O Processor is performing a Read-Modify-Write operation such processor must inform all other processors that such operation is occurring so that the I/O processor performing such operation can complete the operation before the host I/O bus becomes available to all other I/O processors.

BRIEF SUMMARY OF THE INVENTION

In accordance with the invention, the system utilizes an auxiliary I/O processor, separate from the host processor, the host processor being capable of interruption by the I/O processor. When interrupted the host processor accesses a specifically designated micro-program location and asserts a special code bit combination (referred to as the "external condition" code) which corresponds to a special form of interrupt, referred to herein as a "micro-interrupt" in contrast to a standard, or normal, interrupt condition used in presently available systems. During a micro-interrupt, the I/O processor requires a re-allocation of the contents of a memory allocation, (i.e. a memory address translation) unit, referred to as a MAP unit, thereof. Once a MAP unit has been appropriately re-allocated data can be transferred directly between the I/O processor and the host main memory via the MAP unit without the need for further processing time on the part of the host processor.

If the I/O processor is requesting a micro-interrupt, upon receipt of the external condition coded bit combination it compares such code to a fixed code which represents a micro-interrupt condition and asserts an external condition signal (HEXT COND) which is transferred to the host processor and indicates that the host is being interrupted by a "true" micro-interrupt from the I/O processor. Once the host processor identifies the interrupt request as a micro-interrupt request, the host accesses a micro-interrupt routine at a specified location in a read-only-memory (ROM) of the host processor and performs the necessary steps providing for the desired MAP re-allocation, the data which specifies the re-allocation being in the host main memory.

If the I/O processor is requesting a normal interrupt, rather than a micro-interrupt, the host processor processes the interrupt in an appropriate manner as would be well-known to those in the art, using whatever processing time is normally required on the part of the host processor. In contrast, once a micro-interrupt process has been instituted and the re-allocation has been complete, data transfer is controlled directly by the I/O processor without the need for such further host processing time. The use of a micro-interrupt process thereby provides a mechanism by which an I/O processor can provide a fast and efficient data transfer. Once the host processor has identified the interrupt request as a micro-interrupt it can immediately and automatically access previously stored data for providing the desired memory re-allocation without the need to perform its normal, more time-consuming software interrupt handling routine. The I/O processor can communicate directly with the host memory while the host processor performs its own operation in a manner which permits it, in effect, to ignore such I/O processor/host memory communication.

Further, in accordance with the invention, an I/O processor which is performing a Read-Modify-Write operation (i.e., reading the contents of a specified location in the host main memory, modifying such contents, and rewriting the modified contents into the same location) asserts a special signal which prevents any other I/O processor which may be connected to the host I/O bus from gaining access to any location in main memory until such Read-Modify-Write (RMW) operation has been completed. In effect, the I/O processor which is performing the RMW operation overrides the operation of all other I/O processors on the host I/O bus so that no other I/O processor can obtain access to the host processor.

DESCRIPTION OF THE DRAWINGS

A preferred embodiment of the invention can be described with the help of the accompanying drawings wherein.

DESCRIPTION OF THE INVENTION

Figure 1:
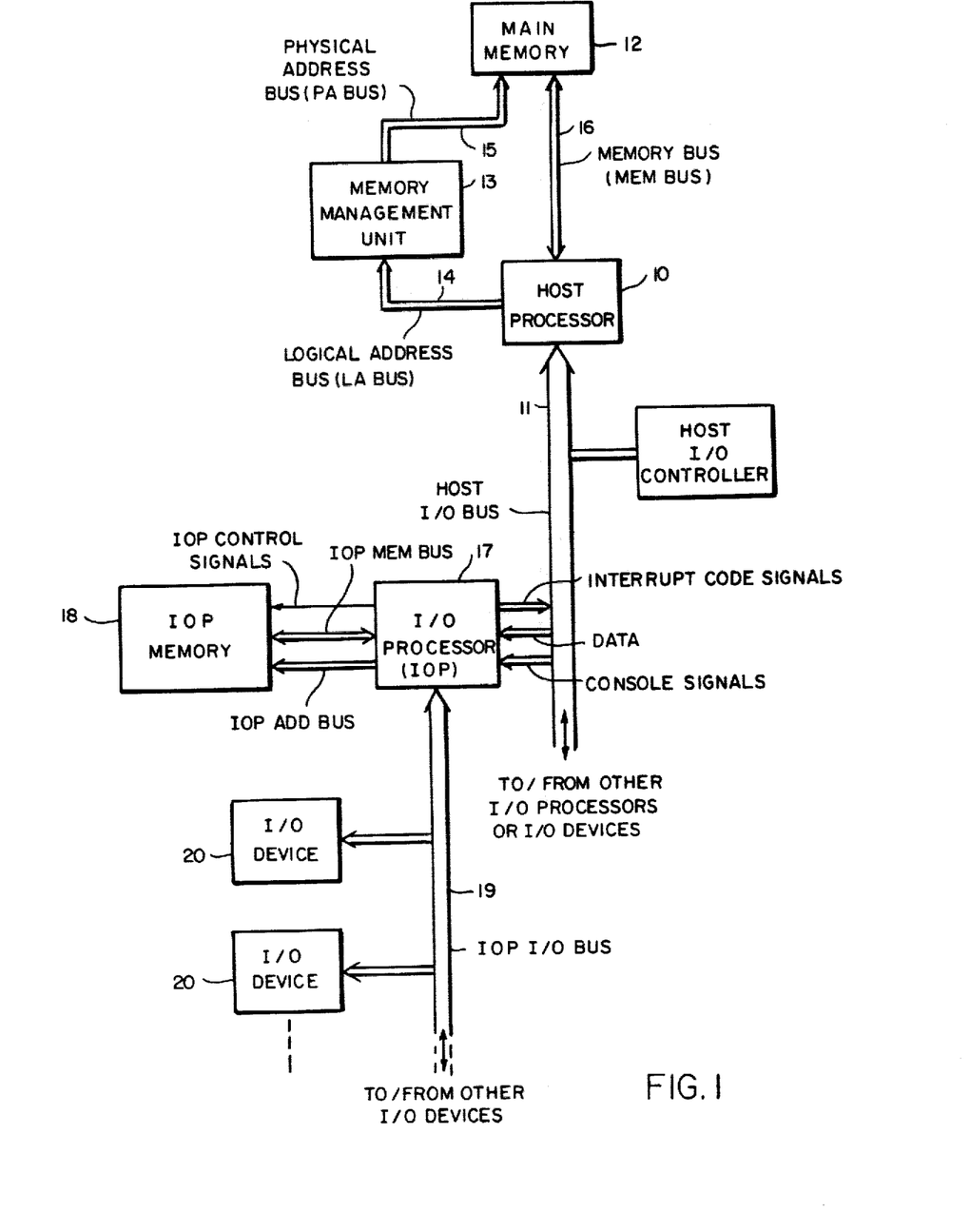
FIG. 1 shows a block diagram of an overall data processing system using an I/O processor in accordance with the invention.

FIG. 1 shows an exemplary system in which the invention is used. As can be seen therein a host processor 10 has a host I/O bus 11, for communication with appropriate I/O devices, and a main memory 12, the allocation of addresses being supplied to the main memory being appropriately managed by a memory management unit 13 which converts logical addresses received on logical address bus 14 into physical addresses in the main memory as supplied thereto on physical address bus 15. Data to and from the main memory are transferred on memory bus 16. An I/O processor 17, as discussed above, communicates with the host processor on the host I/O bus 11, has its own local IOP memory 18, and communicates with I/O devices 20 on its own IOP I/O bus 19.

In a preferred embodiment of the invention the host processor and the I/O processor are of the Eclipse ® type known to those in the art as manufactured and sold by Data General Corporation, Southboro, Mass. Such data processor system and its operation is described, for example, in the publication "User's Manual Programmer's Reference, Eclipse ® Line Computers", 015-000024, with specific reference to the writable control store aspect thereof, in the publication "User's Manual Programmer's Reference, S/130 Micro Programming WCS Feature", 015-000069, and "User's Manual, Interface Designer's Reference Nova and Eclipse ® Line Computers", 015-000031, such publications copyrighted and published by and available from Data General Corporation. Since, in accordance with such publications, the structure and operation are known to the art, the system need not be described in further detail here.

Figure 2:
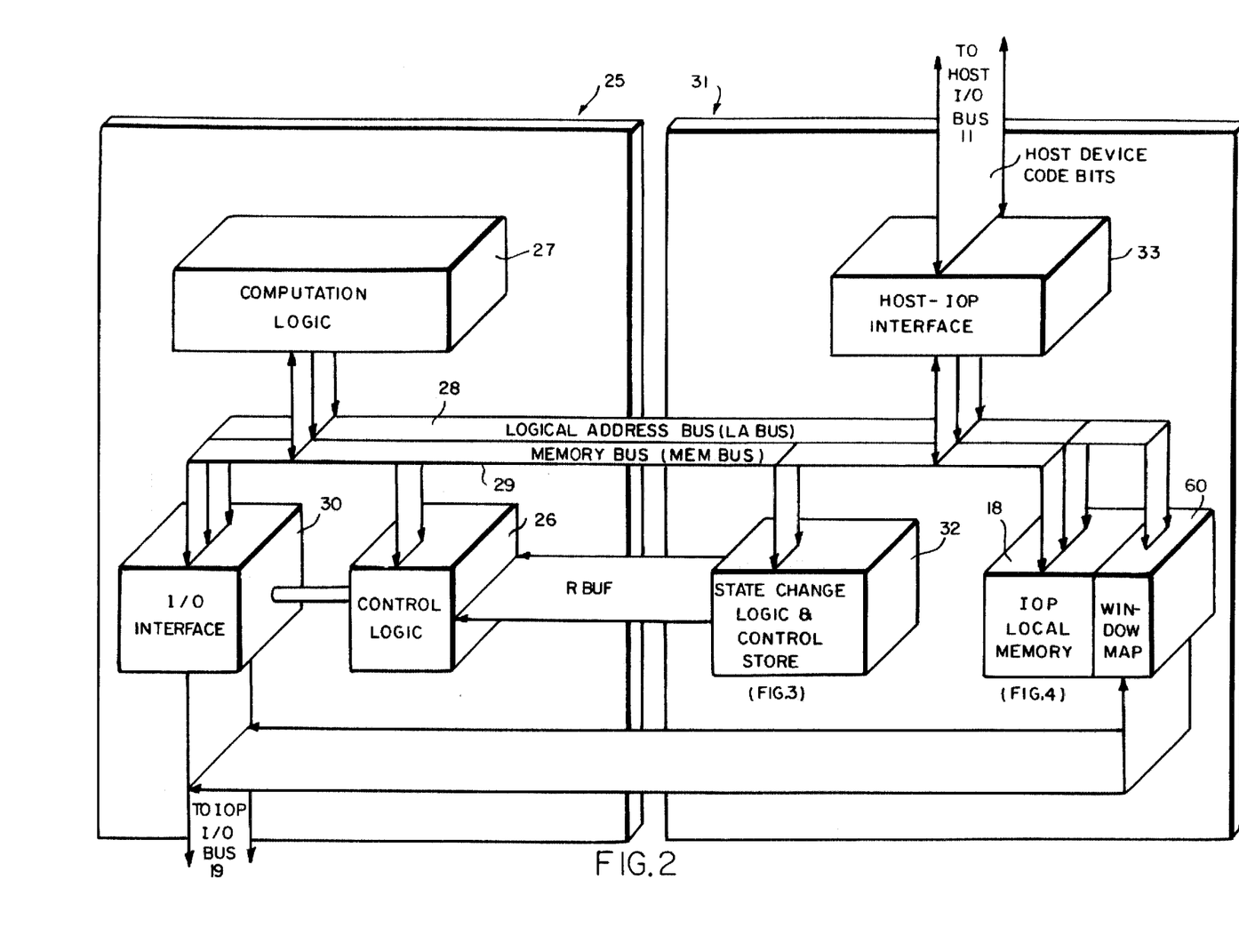
FIG. 2 shows a block diagram of the I/O processor of FIG. 1.
Figure 3:
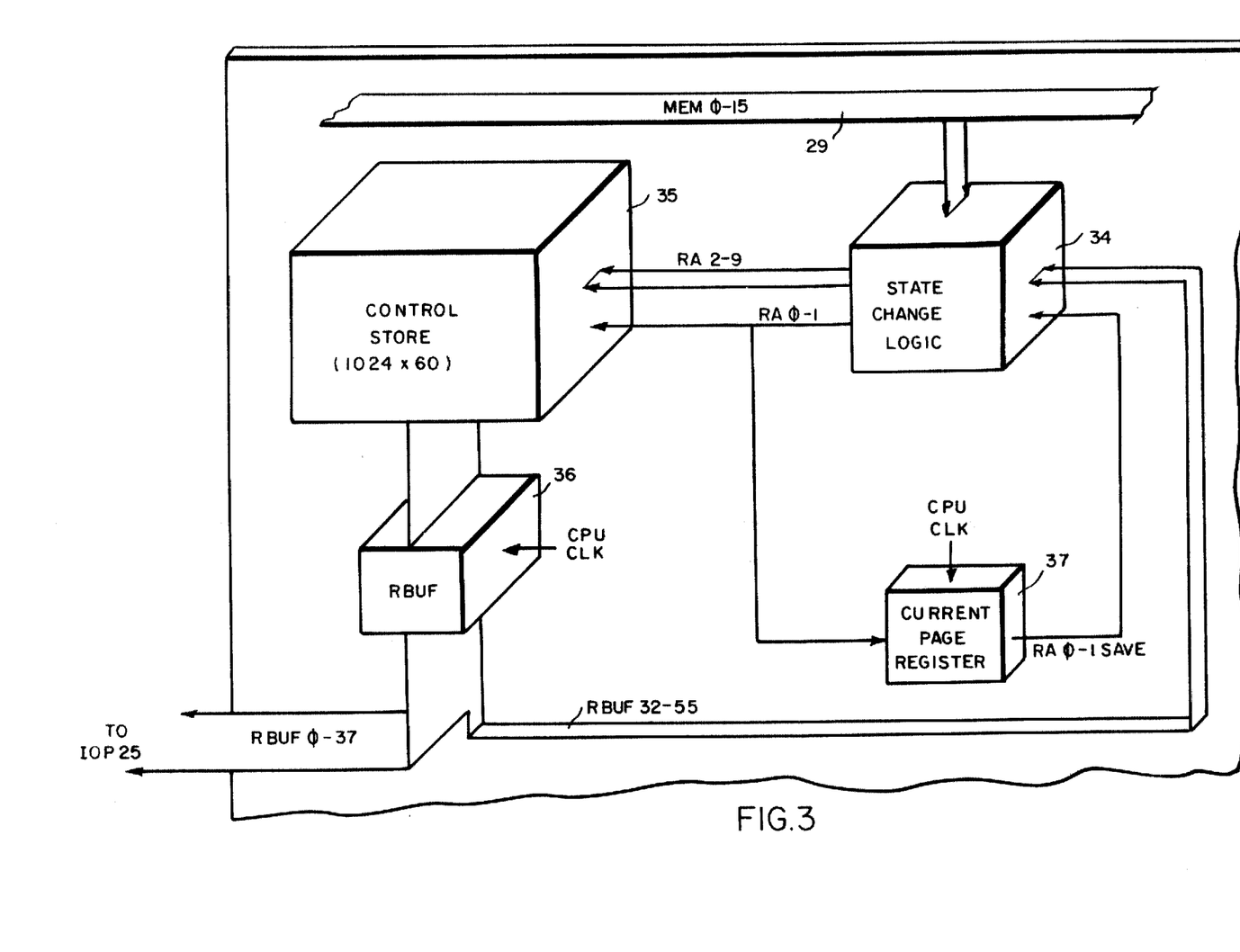
FIGS. 3 and 4 show block diagrams of portions of the I/O processor of FIG. 2.
Figure 4:
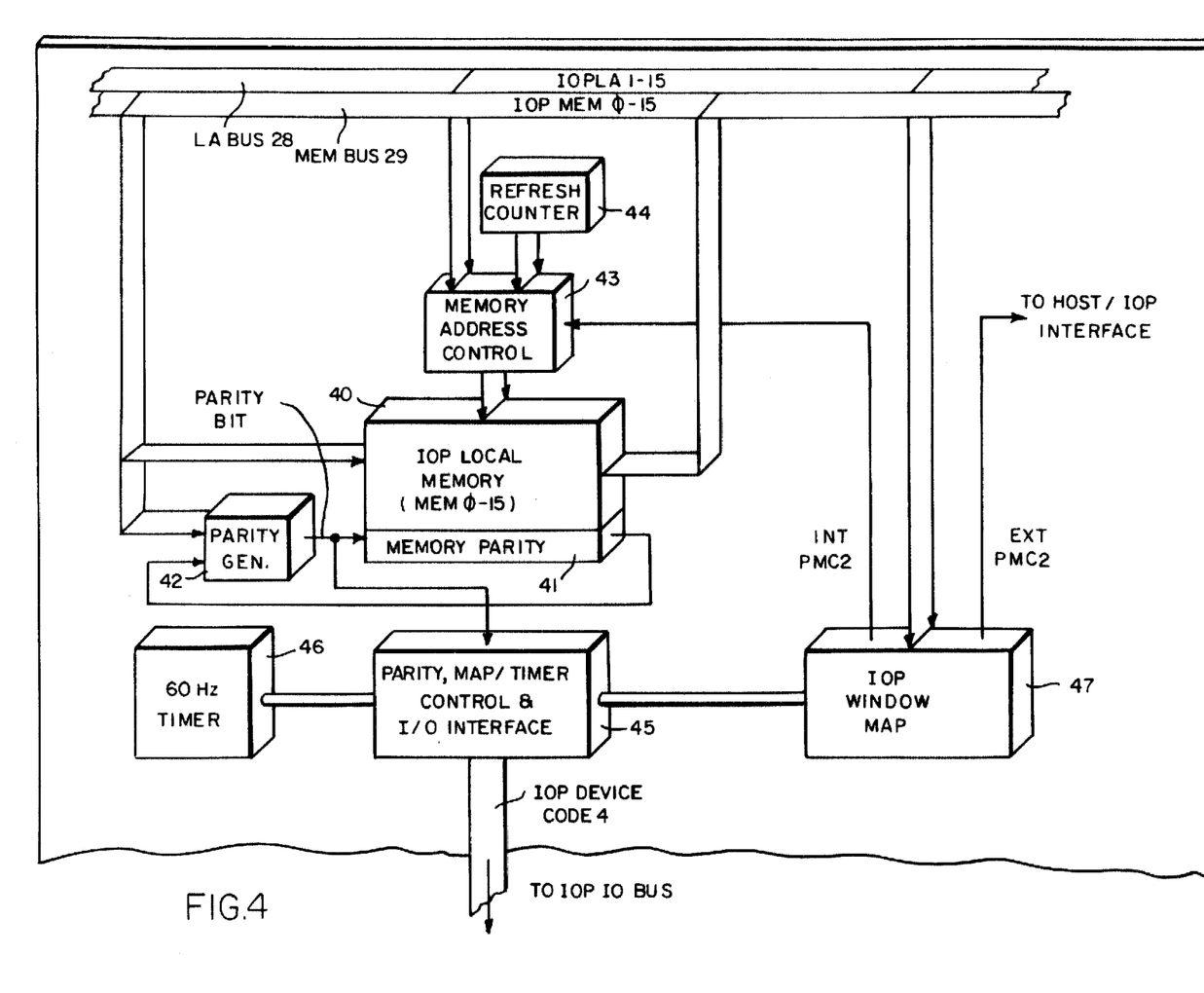

The I/O processor and I/O processor memory are shown in further detail in the block diagram of FIG. 2. In effect, the processor can be described as comprising a first central processor unit on processor board 25 which unit comprises control logic 26 and computation logic 27 and an appropriate logical address bus 28 for transferring addresses among the various I/O processor units and a memory bus 29 for transferring data thereamong. Appropriate I/O interface logic 30 is included for communication with I/O devices via the IOP I/O bus 19. Communication with the host processor is achieved by other logic circuitry on a second processor board 31 which includes a state change logic and control store unit 32 (described in more detail with respect to FIG. 3) and appropriate interface logic 33 for communicating with the host processor via the host I/O bus 11.

The IOP memory is also placed on board 31 and includes the local memory 18 and a memory management unit (MAP) 60 for providing memory allocation as discussed in more detail with respect to FIG. 4. The IOP I/O bus is supplied to the memory allocation unit as shown in FIG. 2. The state change logic and control store as shown in FIG. 3 includes state change logic unit 34, control store unit 35, a ROM buffer register (RBUF) 36, and a register 37 for identifying the current page being accessed in control store. The state change logic unit 34 communicates with other units of the I/O processor via memory bus 29 and the output of RBUF unit 36 provides an RBUF signal to the control logic 26 on I/O processor board 25, a portion of such signal, namely, RBUF bits 32–35 being supplied also to state change logic unit 34.

The memory and MAP unit 18 of the I/O processor is shown in FIG. 4 and includes the I/O processor local memory which includes memory parity logic 41. Data is supplied to local memory 40 from the memory bus 29, the memory parity bit being supplied to memory parity logic 41 via parity generator unit 42. Data is supplied from the local memory to the memory bus 29 as shown. In accordance with standard practice the memory has a memory address control unit 43 for supplying addresses thereto via the logical address bus 28. The memory is refreshed periodically in accordance with refresh counter unit 44 in a manner well known to those in the art. Control logic for controlling the parity detection and the MAP/timer operation, as well as providing logic to interface with the IOP I/O bus, is shown by unit 45. The memory allocation is appropriately determined by the I/O processor window MAP unit 47 which controls whether the processor is to access the local memory (when the EXT PMC2 signal is asserted) or the host memory via the host/IOP interface (when the INT PMC2 signal is asserted), as discussed in greater detail below. As discussed above in general terms, a key feature of the invention herein lies in the ability to interrupt the host processor in a way which reduces the processing overhead time of the host processor and effectively permits direct control of the host memory allocation. Such interrupt is defined, as described above, as a "micro-interrupt" process, the operation of which is best described with the help of the logic shown in FIG. 5.

To initiate the micro-interrupt operation the I/O processor must execute a specified instruction therefor (identified as the DOB ac, 4/ instruction) which asserts an SDATOB signal. The six least significant bits of the instruction (such bits are referred to as the "device code" and are identified in FIG. 5 as SLAVE DS$\phi$-DS5) are compared with a fixed 6-bit code (representing device code 4) at comparator 50. If the SLAVE DS$\phi$-DS5 bits match the fixed "device code 4" bits, comparator 50 asserts a SLAVE SELECT signal.

The assertion of SDATOB and SLAVE SELECT provides a START MAP INT signal at the output of AND gate 51. Such signal is supplied to a J-K flip-flop unit 52. Flip-flop 52 provides at its Q output a signal for OR gate 54 (at the bottom of FIG. 5) when a micro-interrupt is being requested. OR gate 54 also has an input which indicates when a standard interrupt is being requested, the logic for such standard interrupt indication being well known and, for the purposes of describing the invention herein, will not be discussed in further detail here.

Figure 5:
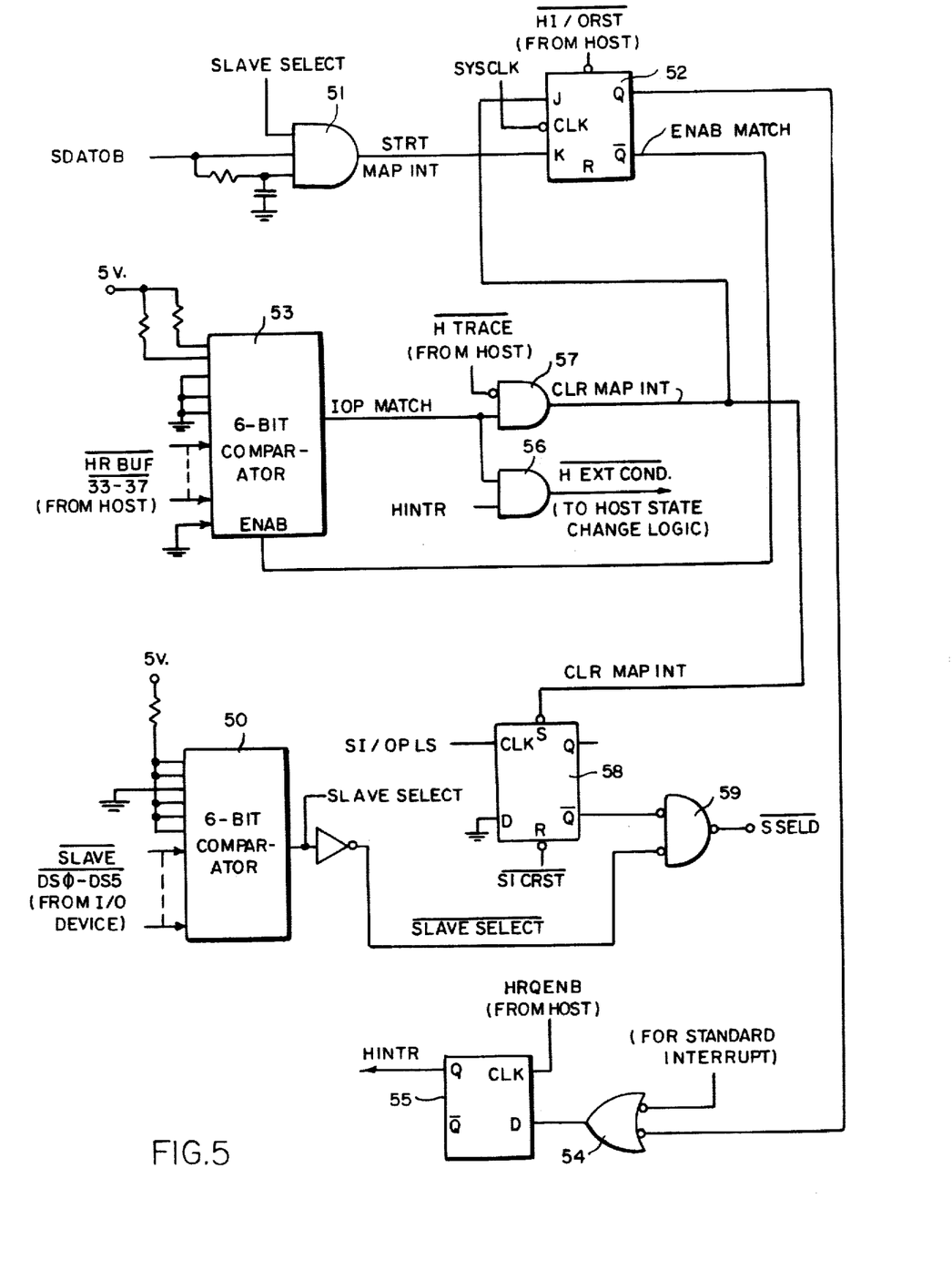
FIG. 5 shows a block diagram of specific logic used in the "micro-interrupt" process in accordance with the invention.

The output of OR gate 54 is supplied to a D flip-flop unit 55 which is periodically clocked by a host REQUEST ENABLE signal (HRQENB) in accordance with the standard host I/O interface logic. D flip-flop 55 thereupon produces a signal indicating to the host that an interrupt is being requested by the I/O processor, such signal identified as the HINTR signal.

It is helpful at this point in understanding the micro-interrupt operation to review the operation of a known host processor of the Eclipse type as mentioned above. As is known the host processor is of the micro-programmed type and includes state change logic which determines the next micro-address in the host ROM for the host processor's next micro-instruction, such determination being implemented throuh a 6-bit field (identified as HRBUF 32-37) in the current micro-instruction. The 6-bit field specifies a test for selecting a "true" or a "false" address as the address for the next micro-instruction. Selected state change codes of the host processor (e.g., in the Eclipse processor, the state change codes 40-77) represent external condition state change codes, one of the bits of the above 6-bit field (HRBUF 32) being asserted for such external condition state change codes.

The test performed with reference to the external condition state change codes by the host is the sampling of the HEXT COND signal. When an external state change code is present and the HEXT COND signal is asserted, the true address is selected as the address for the next micro-instruction. If the HEXT COND signal is not asserted in the presence of an external condition code, the false address is selected. HRBUF 32 indicates the presence of an external condition state change code and HRBUF 33-37 specify a device which the host selects to be tested.

Thus, as seen in FIG. 5, comparator 53 is enabled by the ENAB MATCH signal from J-K flip-flop 52. If HRBUF 33-37 match the fixed 5 bits (representing the IOP state change external condition code) at the comparator 53 in the I/O processor and if the interrupt (signified by an IOP MATCH signal) has been synchronized at AND gate 56 with the HINTR signal from D flip-flop 55, the HEXT COND is asserted and supplied to the host processor from the I/O processor to signify that the I/O processor is requesting a micro-interrupt. The host processor recognizes the assertion of the HEXT COND signal from the I/O processor as a true micro-interrupt and thereupon selects the true address for the micro-interrupt operation. The test to determine whether the interrupt is a true micro-interrupt is performed at a designated microprogram location in the interrupt handling microcode of the host processor.

When such a true micro-interrupt occurs, the host processor accesses, from a known location in the main memory, the pointer to the data which identifies how many changes are going to be made in the MAP, which MAP is to be changed, and the data for the change. The host then transfers the data block from memory into the data channel MAP so that the MAP is then available for translating logical addresses received from the requesting I/O processor into physical addresses in the host main memory.

When the selected host data channel MAP unit has had its contents so changed to provide for the host memory re-allocation, the host sends an appropriate indication thereof, i.e., the HTRACE signal, which as shown in FIG. 5 is supplied to gate 57 together with the IOP MATCH signal from comparator 53. The latter signal again arises from a second comparison of the HRBUF bits 33-37, supplied thereto from the host, with the fixed bits at comparator 53. When the HTRACE signal and the IOP MATCH signal are asserted, the CLR MAP INT signal from gate 57 indicates that the selected data channel MAP has been loaded with its new contents. The CLR MAP INT signal is supplied to the J input of J-K flip-flop 52 to disable the comparator 53. The CLR MAP INT signal is also supplied to a flag flip-flop 58 (a D flip-flop circuit), the Q output of which is supplied to gate 59 together with the SLAVE SELECT signal to produce an S SELD signal which indicates to the I/O processor that the memory re-allocation in the selected MAP unit of the host processor has been completed as required.

At such point the host MAP status (not the MAP contents) in the host is restored, the capability for receiving interrupts by the host processor is again restored, and the host processor can continue its own program operation without further processing or communication being required between the host processor and the I/O processor.

Figure 6:
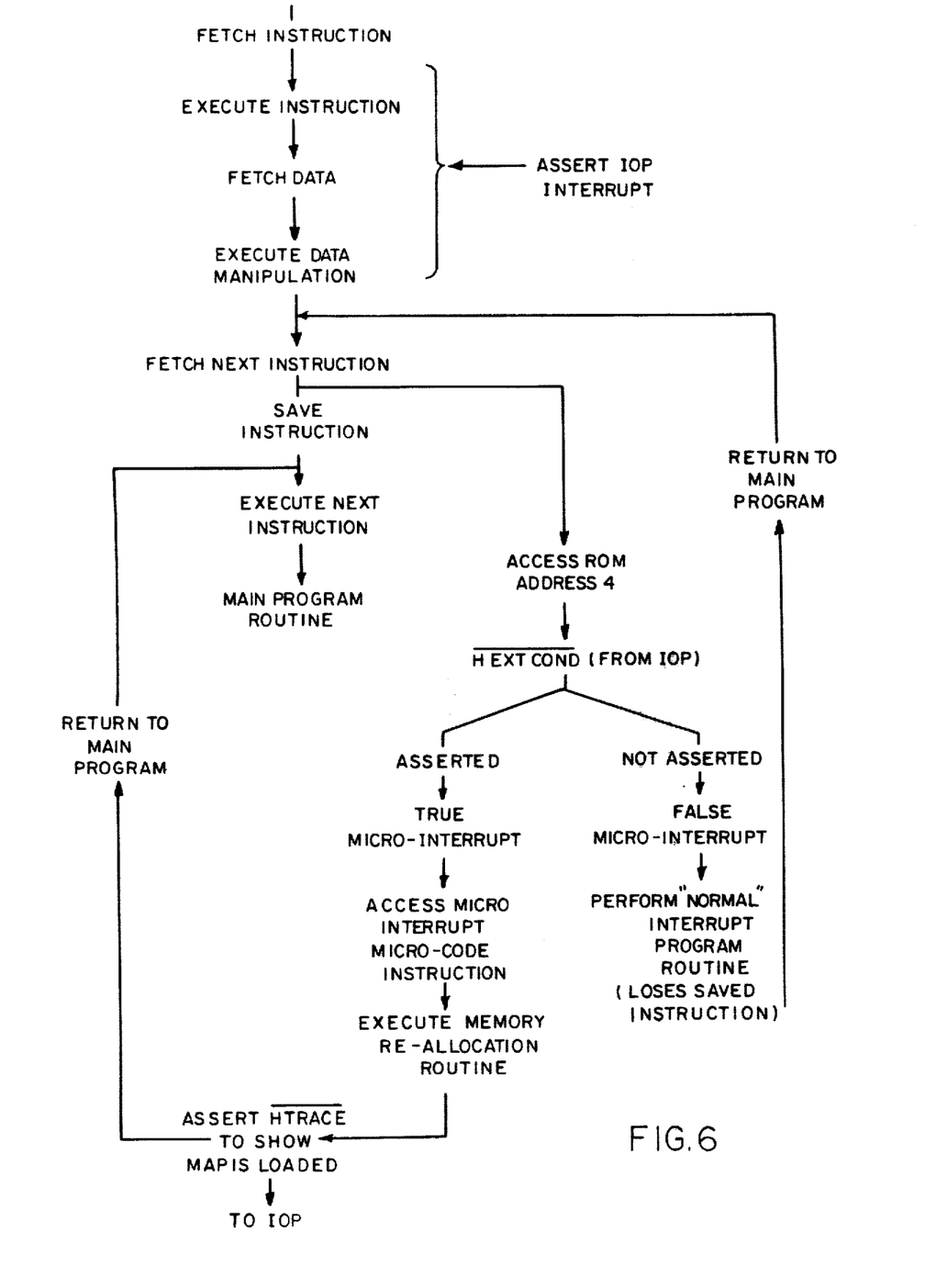
FIG. 6 shows a flow chart of the steps which occur during a micro-interrupt of the host processor by the I/O processor.

Accordingly, the micro-interrupt process, as described above avoids the processing time that the host processor normally must perform in order to process a standard or normal interrupt. It is helpful in this connection to consider the relationship of the micro-interrupt operation with reference to the steps of a program being performed by the host processor, as shown in FIG. 6. Thus, the host processor, in the course of performing programmed steps, fetches an instruction, executes the instruction, fetches data in response thereto, and then executes whatever data manipulation is required before fetching the next instruction. Such process is a conventional process performed by a central processor unit in performing a program. The assertion of an interrupt from the I/O processor then occurs between the time in which the host central processor unit fetched the last instruction and the time at which it fetches the next instruction. In accordance with standard interrupt processes following the fetching and saving of the next instruction of the host program, the host processor accesses the read only memory address, as discussed above, so that it can make a determination as to whether an interrupt is a normal interrupt or a micro-interrupt.

If the I/O processor provides a HEXT COND signal (as discussed above with reference to FIG. 5) so that the host processor knows that the interrupt is a "true" micro-interrupt the host processor thereupon accesses the micro-interrupt micro-code instruction which permits the execution of the memory re-allocation routine for changing the contents of a selected data channel MAP. Once the MAP contents are appropriately re-allocated (loaded), the host processor asserts its HTRACE signal to show such condition and supply such signal to the I/O processor. The host processor can then return to its own main program to execute the next instruction that had been previously fetched and saved, thereupon returning to its main program routine.

If the HEXT COND signal is not asserted by the I/O processor, the host then knows that there is a normal interrupt condition. The host processor thereupon performs its normal interrupt program routine in accordance with standard practice well known in the art. Following the normal interrupt program routine the host processor thereupon returns to the main program but because of the need for the host processor to use its own internal registers in a normal interrupt, the previously saved instruction has been lost and it must again fetch the next instruction before it can resume its own main program routine.

With reference to FIG. 5, when the S SELD signal at the output of logic 59 has been flagged to indicate that the micro-interrupt process has been completed by the host processor, the I/O processor software is devised to test the flag condition so that when it is determined that the micro-interrupt processing has been completed (by the presence of the S SELD signal) the I/O processor software can then proceed to perform the desired data transfer routine for which the interrupt was originally requested. The transfer of data to and from the host memory via the host I/O bus and the host/IOP interface 33 (see FIG. 2) is performed by appropriate logic which is well known to those in the art and, accordingly, the host/IOP interface unit need not be described in more detail. For the purpose of such data transfer the I/O processor, in effect, acts as an I/O device with reference to the host and requires the standard interface control logic normally used for transferring addresses and data to the host from an external I/O device in a manner well known to those in the art.

In FIG. 2 the window MAP unit 60, associated with the I/O processor local memory unit 18, determines whether the I/O processor is to access the IOP local memory 18 or is to access the host main memory 12 via the host I/O bus 11. Accordingly, the window MAP unit 60 acts as an I/O processor memory management unit for providing operation either with respect to the local memory or with respect to the host memory. The MAP unit 60 provides operation in two modes, "user" mode and "data channel" mode, either one of which can be "on" or "off" in any combination thereof, as indicated by the signals USER MODE and DCH MODE from flip-flops 64 and 65, respectively, in FIG. 7.

Figure 7:
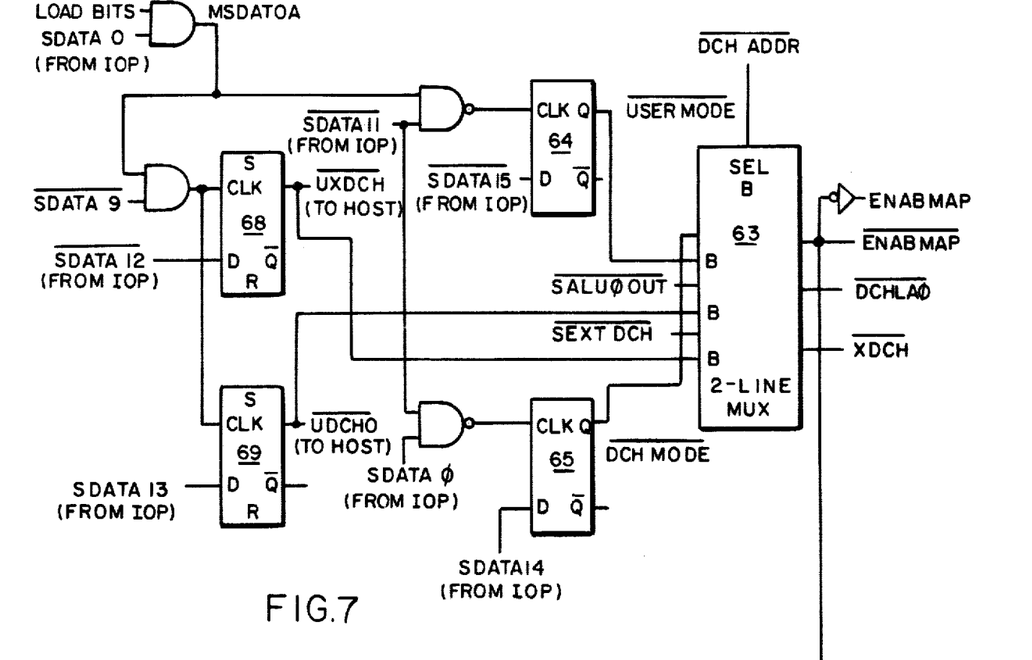
FIGS. 7 and 8 show a block diagram of specific logic used in determining whether a memory reference is to the I/O processor local memory or to the host processor memory.
Figure 8:
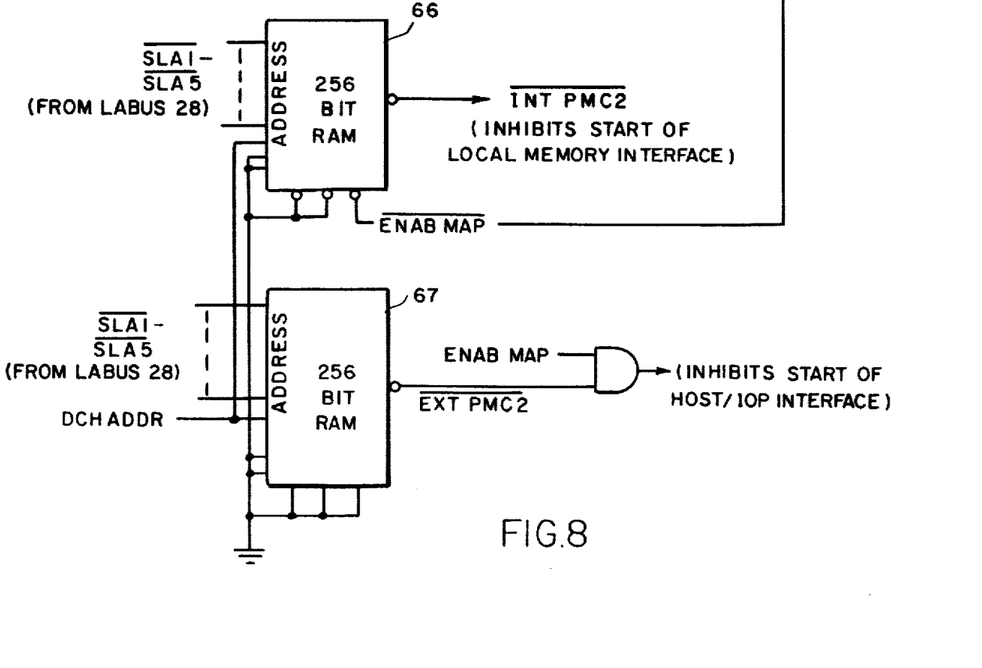

FIGS. 7 and 8 show the specific window MAP logic. The USER MODE signal at D flip-flop 64 indicates whether or not a program memory reference requires a decision by the window MAP logic to determine whether the program reference is for the I/O processor local memory or the host memory via the host/IOP interface. If the USER MODE signal is not asserted the program reference automatically is determined to be a local memory reference, while if USER MODE is asserted the window MAP logic determines whether the local memory interface is to be inhibited from starting (INT PMC2 is asserted at RAM 66) or the host/IOP interface is to be inhibited from starting (EXT PMC2 is asserted at RAM 67). The DCH ADDR signal distinguishes whether the reference is a program reference (DCH ADDR is not asserted) or a data channel reference (DCH ADDR is asserted). The operation with respect to a data channel reference (DCH MODE) at D flip-flop 65 is similar to that with respect to the program reference (USER MODE).

If the memory reference is for the host memory, since there are four MAPs in the host processor which can be used for translating logical addresses into physical addresses in the host memory, two additional bits must accompany the normal 15 address bits to identify which of the four host MAPs is to be used. Such bits are obtained at multiplexer 63 and identified as DCHLA$\phi$ and XDCH. If an I/O device on the I/O processor I/O bus requests a data channel access, it provides 15 bits of address as I/O processor data bus SDATA1-15 and the two map select bits as SDATA$\phi$ and SEXT DCH. SDATA1-15 are provided to the window MAP when DCH ADDR is asserted as logical address bits 1-15, and SDATA$\phi$ as SALU$\phi$ OUT. SALU$\phi$ OUT is supplied from multiplexer 63 as DCHLA$\phi$, and subsequently is sent to the host as bit $\phi$ of the host's I/O bus. SEXT DCH is supplied from multiplexer 63 as XDCH at the output thereof, and is subsequently sent on to the host as EXTERNAL DCH. If the program supplies the logical address (a program reference), the two bits required for identifying the MAP are obtained as UXDCH and UDCHO at the multiplexer from D flip-flops 68 and 69.

As mentioned above, if the I/O processor is reading the contents of a specified location in the host main memory, modifying such contents, and re-writing the modified contents into the same location, a Read-Modify-Write (RMW) operation, other I/O processors must be prevented from gaining access to that same host memory location until the RMW operation is completed. Such capability is provided by the assertion of a RMOD PENDING signal by the I/O processor which is performing the RMW operation. As long as the RMOD PENDING signal is asserted then the particular I/O processor performing an RMW operation is uninterruptable, even by a higher priority I/O processor.

Figure 9:
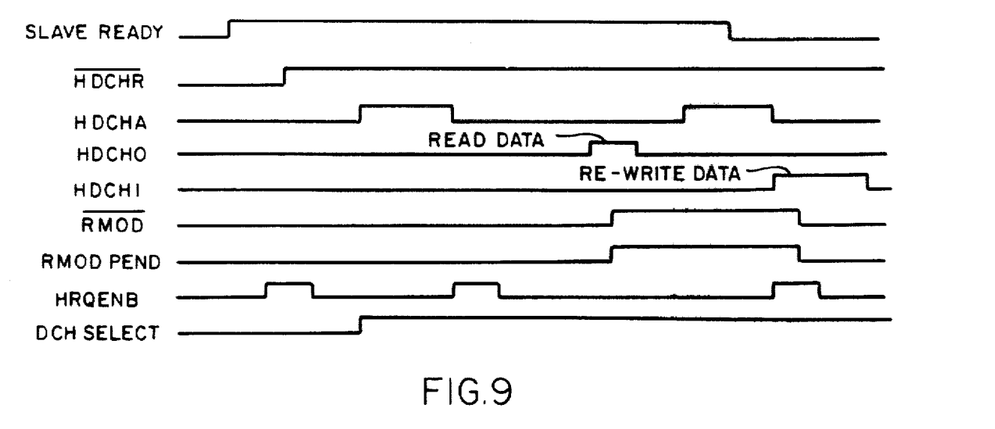
FIGS. 9 and 10 show, respectively, a timing diagram and a block diagram of the logic used in preventing access to the host memory during a read-modify-write operation by the I/O processor.
Figure 10:
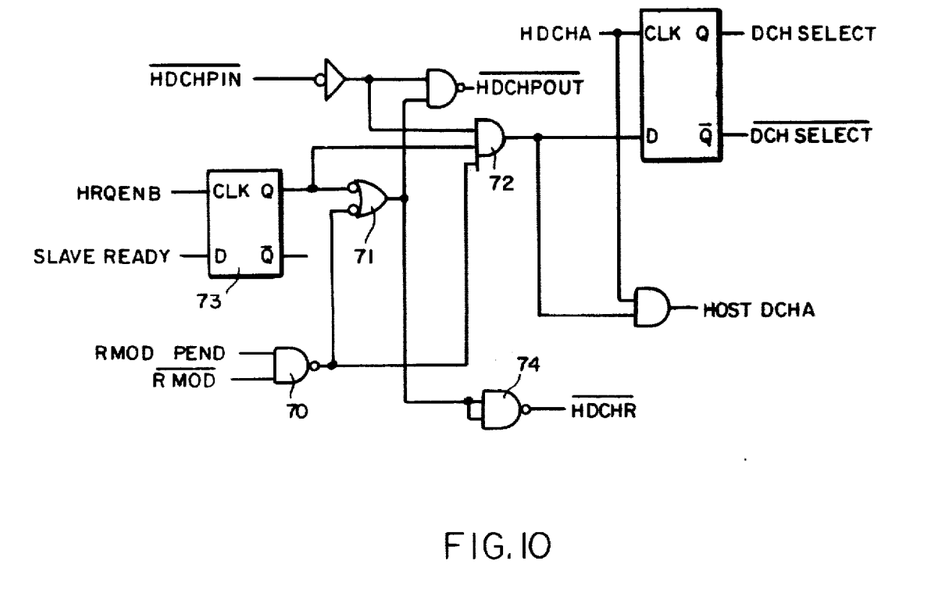

The timing diagram of FIG. 9 and the logic diagram of FIG. 10 are helpful in understanding such operation. The logic diagram shows, in effect, the standard data channel interface to an Eclipse ® processor from the I/O processor except for modification required with respect to the RMOD and RMOD PENDING signals. The RMOD signal is internally generated by the I/O processor for providing the RMOD PENDING signal which is supplied externally thereto to inform all other I/O processors that they cannot respond to the data channel control signals HDCHA, HDCHO, and HDCHI until the cycle following the "re-write" operation of the asserting I/O processor. The SLAVE READY signal is also generated internally by the I/O processor and signifies that the I/O processor is requesting a data channel access to the host. In accordance with standard Data General Corporation interface logic, this causes the HDCHR signal to be asserted at gate 74 at the time the HRQENB signal clocks flip-flop 73. The I/O processor will then respond to the host data channel acknowledge signal (HDCA) by asserting the HOST DCHA signal and the DCH SELECT signal, if the host data channel priority in signal (HDCHPIN) is also true.

The timing diagram shows the relationship among the host data channel request signal (HDCHR), the host request enable signal (HRQENB), the host data channel acknowledge signal (HDCHA), the host data channel output and input signals (HDCHO and HDCHI), the RMOD signal and the RMOD PENDING signal. Such host signals (HDCHA, HDCHR, HDCHO, HDCHI, HRQENB) are of the type used in the Eclipse ® processor, as discussed in the above referred to publications thereon, particularly in the Interface Designer's Reference Manual. The RMOD and RMOD PENDING signals are asserted after assertion of the HDCHO signal (i.e., while the data is being read) and lasts until after the assertion of the HDCHI signal (i.e., while the modified data is being re-written). During such time period another I/O processor cannot respond to the HDCHA signal until the next cycle following the non-assertion of RMOD PENDING, i.e., the cycle following the "rewrite" of the first processor once the data has been modified. This is because RMOD of the non-asserting I/O processor will be false, with RMOD PENDING true. The output of gate 70 will thus be low forcing the output of gate 71 high and the output of gate 72 low, as if the non-asserting I/O processor were not requesting a data channel access of host memory, regardless of the Q output of flip-flop 73. The non-asserting processor will thus not assert its DCH SELECT signal or its HOST DCHA signal at the time that the HDCHA signal initiating the rewrite cycle in the asserting processor is received. Moreover, the non-asserting processor will not force the channel priority out signal (HDCHPOUT) high.

What is claimed is:

1. A data processing system comprising a host processor having a microprogram control store, a host processor memory, and a host memory management unit, the contents of which permit the conversion of logical addresses received by said host processor into physical addresses for said host memory, and further comprising an input/output processor;
input/output bus means for providing communication between said input/output processor and said host processor, said host processor being capable of generating a specified coded signal in response to any interrupt request from said input/output processor;
said input/output processor including
means for generating a micro-interrupt request signal for said host processor to request a re-allocation of a selected position of the contents of said memory management unit; and
micro-interrupt indentifying means responsive to said specified coded signal received from said host processor and to said micro-interrupt request signal of said input/output processor for providing a signal to said host processor for identifying said interrupt request as one requiring the re-allocation of said selected portion of the contents of said memory management unit, whereby said host processor can perform such re-allocation in accordance with a specified program in its micro-program control store;
said input/out processor thereby being capable of accessing said host memory and said memory management unit via said input/output bus means for the direct transfer of logical addresses to said re-allocated selected portion of said memory management unit and for the direct transfer of data between said input/output processor and said host memory when said selected portion of said memory management unit has been re-allocated.

2. A data processing system in accordance with claim 1 wherein said input/output processor has an instruction register containing an instruction and said micro-interrupt identifying means includes first logic means responsive to a first fixed coded signal and to a coded portion of said instruction signal from said instruction register for providing a first matching signal when said first fixed coded signal and said coded portion of said instruction signal match; and
second logic means responsive to said first signal and to said micro-interrupt request signal for providing a second signal indicating that a micro-interrupt has been requested.

3. A data processing system in accordance with claim 2 wherein said micro-interrupt identifying means further includes second means responsive to a second fixed coded signal and to said specified coded signal from said host processor to provide a second matching signal when said second fixed coded signal and said specified coded signal match;
means responsive to said second signal and and to a periodic signal from said host processor to provide an internal interrupt signal;
means responsive to said second matching signal and to said internal interrupt signal for providing an external condition signal to said host processor indicating that the interrupt request is a true micro-interrupt request.

4. A data processing system in accordance with claim 3 wherein said input/output processor further includes means responsive to a signal provided by said host processor when the re-allocation of said selected portion of said memory management unit has been completed for providing a signal to the input/output processor control logic means to indicate that said re-allocation has been completed.

5. A data processing system in accordance with claim 1 wherein said input/output processor has a local memory and further includes window map means for selectively providing access to said local memory or to said host processor memory in accordance with a selected memory reference signal, said window map means comprising
multiplexer means capable of being responsive to either a program memory reference signal or a data channel memory reference signal and further responsive to a memory reference identifying signal which selects which of said memory reference signals the multiplexer means is responsive to, said multiplexer means thereby selectively providing an enabling signal which depends on the state of the memory reference signal to which said multiplexer means responds; and inhibit logic means responsive to the selective provision of said enabling signal and to said memory reference identifying signal for inhibiting access either to said local memory or to said host processor memory depending on whether the memory reference is to said local memory or to said host processor memory.

6. A data processing system in accordance with claim 5 wherein said inhibit logic means includes means for providing a first inhibit signal for inhibiting the start of the interface of said input/output processor and said local memory when the memory reference to to said host processor memory and means for providing a second inhibit signal for inhibiting the start of the interface of said input/output processor and said host processor when the memory reference is to said local memory.

7. A data processing system in accordance with claim 6 wherein said host memory management unit has a plurality of memory allocation units and said multiplexer means is further responsive to a selected one of two sets of bits depending on whether the memory reference is a program memory reference or a data channel memory reference for providing an output set of bits for identifying a selected one of said plurality of memory allocation units, said output set of bits being supplied to said host processor as an extension of the logical address for said memory reference.

8. A data processing system in accordance with claim 7 wherein each of said two sets of bits comprises a pair of bits and said output set of bits is a pair of bits for identifying one of four of said plurality of memory allocation units.

9. A data processing system in accordance with claim 1 wherein said input/output processor further includes means for preventing any other processor from accessing said host processor memory when said input/output processor is performing a read-modify-write operation with respect to data in said host processor memory.

10. A data processing system in accordance with claim 9 wherein said access preventing means includes means for generating an access inhibiting signal which starts when the data in said host processor memory is being read by said input/output processor and ends when the modified data is being rewritten into said host processor memory, said access inhibiting signal being supplied to other input/output processors on the host input/output bus means to prevent other processors from obtaining access to the location in said host memory at which said data is being read, modified and rewritten.

11. A data processing system comprising a host processor having a microprogram control store, a host memory and a host memory management unit and further comprising an input/output processor;

first input/output bus means for providing communication between said input/output processor and host processor;

second input/output bus means for providing communication between said input/output processor and one or more devices external to said input/output processor;

said input/output processor including a local memory;

a logical address bus in said input/output processor for providing logical addresses for said local memory or said host memory; and window map means connected to said logical address bus for selectively providing access by said input/output processor or by said one or more external devices to said local memory or to said host processor memory in accordance with a selected memory reference signal, said window map means comprising multiplexer means capable of being responsive to either a user mode signal generated by said input/output processor or a data channel mode signal generated by said input/output processor and further responsive to a memory reference identifying signal generated by said input/output processor which selects which of said user mode or data channel mode signals the multiplexer means is responsive to, said multiplexer means thereby selectively providing a window map enabling signal which depends on the state of the selected user mode or data channel mode signal to which said multiplexer means responds; and inhibit logic means comprising random access memory means responsive to said window map enabling signal, to said memory reference identifying signal and to address bits from said logical address bus for inhibiting access by said input/output processor or by said one or more external devices either to said local memory or to said host processor memory depending on the contents of said random access memory means.

12. A data processing system in accordance with claim 11 wherein said inhibit logic means includes means for providing a first inhibit signal for inhibiting the start of the interface of said input/output processor and said local memory when the memory reference is to said host processor memory and means for providing a second inhibit signal for inhibiting the start of the interface of said input/output processor and said host processor when the memory reference is to said local memory.

13. A data processing system in accordance with claim 12 wherein said memory management unit has a plurality of memory allocation units and said multiplexer means is further responsive to a selected one of two sets of bits depending on whether the memory reference is a program memory reference or a data channel memory reference for providing an output set of bits for identifying a selected one of said plurality of memory allocation units, said output set of bits being supplied to said host processor as an extension of the logical address for said memory reference.

* * * * *